May 20, 1958 N. T. PIERCE 2,835,167
PHOTOMICROGRAPHIC APPARATUS
Filed Jan. 20, 1954 5 Sheets-Sheet 1

Norton T. Pierce
INVENTOR.

BY Brown and Mikulka
Attorneys

May 20, 1958 N. T. PIERCE 2,835,167
PHOTOMICROGRAPHIC APPARATUS
Filed Jan. 20, 1954 5 Sheets-Sheet 5

Norton T. Pierce
INVENTOR.

BY Brown and Mikulka
Attorneys

United States Patent Office 2,835,167
Patented May 20, 1958

2,835,167
PHOTOMICROGRAPHIC APPARATUS

Norton T. Pierce, Reading, Mass., assignor to Polaroid Corporation, Cambridge, Mass., a corporation of Delaware Application January 20, 1954, Serial No. 405,123

11 Claims. (Cl. 88—40)

The present invention relates generally to apparatus for selecting and transmitting predetermined bands of radiation in the ultraviolet and visual ranges and, as illustrated, relates more particularly to apparatus arranged to be operated manually or automatically to select and direct predetermined wavelengths of ultraviolet and visual radiations to the specimen stage of a microscope.

The present apparatus, illustrating a preferred embodiment of the invention, is designed for use with a camera and projector for the preparation and projection of photomicrographs of pathological specimens as shown and described by Edwin H. Land in "A color translating ultraviolet microscope" (Science, April 15, 1949, vol 109, No. 2833, pp. 371–374).

The apparatus disclosed in the above-mentioned article is intended for use in the diagnosis of pathological specimens containing suspected malignant growths or cells. Thin specimens of pathological tissue suspected of containing such cells are placed on a microscope slide. Ultraviolet light is projected through the specimen and three successive exposures under three different wavelengths of ultraviolet light are made on spaced areas of a photosensitive film. Since the specimens are usually obtained during the course of a surgical operation, it is important that the film be quickly processed so that immediate diagnosis may be made as to the presence or absence of malignant cells and the proper report made to the operating surgeon.

One object of the present invention is to provide an apparatus which may be quickly and easily focused and which may be quickly and easily adjusted to provide successively for the radiation of preselected bands of different wavelengths in the ultraviolet and visual ranges of the spectrum. In the illustrated embodiment of the invention, different portions of the ultraviolet end of the spectrum are selected by tilting or rotating a diffraction grating to cause the desired portions of the ultraviolet band to be directed through an exit aperture. As illustrated, the mechanism for tilting or rotating the diffraction grating comprises a system of electromagnetically activated linkages for causing angular movement of the diffraction grating into successive angular positions relatively to the exit aperture. The present invention contemplates also the provision of means for deactivating the electrically energized mechanism to permit the diffraction grating to be moved into a position wherein radiation in the visible range may be directed into the exit aperture to permit focusing of the microscope.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Ultraviolet microphotography of pathological specimens is useful because not only is the resolving power approximately twice that which can be obtained by visible light, but also because the inherent absorption of ultraviolet radiation by the pathological specimens makes photography thereof possible without the use of dyes or stains. The present apparatus contemplates the use of three different wavelengths to obtain successive formation of three ultraviolet images on spaced areas of the photosensitive film and converting these ultraviolet images into visible images in three primary colors. When these images are superposed, a visible image in full color is obtained and quick and accurate diagnosis of the pathological specimen is possible.

The present invention contemplates an apparatus so arranged that any desired band of radiation in the ultraviolet and the visual ranges may be quickly provided. It is contemplated that the range will be from approximately 2000 Angstrom units (A) to 7000 Angstrom units and that any desired band shall have a width from 10 A. to as much as 100 A. It is further contemplated that the apparatus may be quickly shifted from the ultraviolet range to the visual range to permit focusing and adjustment of the apparatus preparatory to making photographic exposures.

Figure 5:
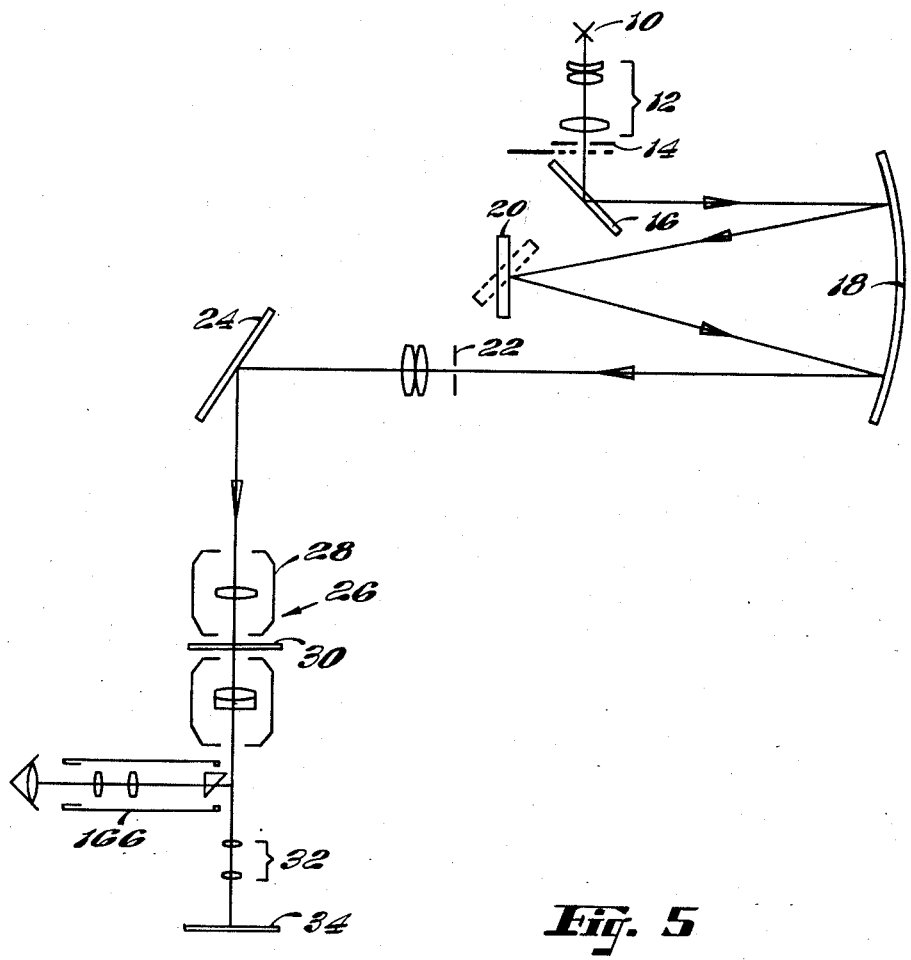
Fig. 5 is a diagrammatic representation of the optical system in which the present invention is incorporated.

As shown most clearly in Figure 5, the apparatus with which the present invention is concerned comprises a source of light 10 in the form of a mercury arc vapor quartz tube which may be controlled in intensity by suitable and conventional devices not shown herein. The radiations from the source 10 pass through a collimating system comprising condensing lenses 12 and through an entrance aperture 14 which permits passage of a beam of radiation varying in width as desired from approximately 0.2 mm. to 1.05 mm. The collimated beam is incident upon a mirror 16 which is so positioned as to reflect the beam to a concave mirror 18 which in turn is so positioned that the beam is again reflected and is incident upon a reflection diffraction grating 20. The grating 20, as will later be described, may be rotated to direct the desired portion of the spectrum of the collimated band of radiation through an exit aperture 22 of approximately 0.3 mm. to 2.0 mm. and onto a mirror 24 which is so positioned that it reflects light into the barrel or tube of a microscope 26, through a condenser lens system 28, through a specimen on a slide 30, through an objective lens system 32 and onto a photosensitive film 34. The condenser and objective lens systems are apochromatic over a wavelength range of 2200 A. to 8000 A. which makes it possible to focus the microscope for ultraviolet light by focusing it with visible light; this eliminates one of the difficulties of ultraviolet photomicroscopy.

The specific details of the microscope and the monochromator, with the exception of the mechanism for controlling the position of the reflection diffraction grating 20, are not described in detail herein since they may be of conventional construction and these details are not necessary for an understanding of the present invention.

The monochromator and its associated mechanism are so designed that bands of varying wavelengths may be directed against the specimen on the stage or slide 30. To this end, the invention contemplates the provision of a monochromator wavelength drive system which is effective to change the angle of the diffraction grating 20 as required, which change may be accomplished cyclically or noncyclically, or the change may be initiated manually or automatically. As illustrated most clearly in Figures 1, 2 and 3, the wavelength drive system comprises a plurality of elements including a mounting 36 which is pivotally mounted and is provided with an arm 38 rigidly fixed to the pivoted mounting 36 through a stub shaft 40. The diffraction grating 20 is rigidly fixed to the mounting 36 and, accordingly, any movement of the mounting is transmitted to the grating 20. The monochromator arm 38 at its free end is provided with a block 42 having converging cam surfaces 44 which are arranged to be engaged successively by positioning rollers 46, 48 and 50 which are actuated through electromagnetic mechanisms which will later be described. The monochromator shaft 40 is mounted in conventional antifriction bearings 52 mounted in a supporting frame or casting 54 which in turn is mounted on the top of a casting 56 which supports and substantially encloses the essential elements of the monochromator. The block 42 is of limited width and, hence, the displacement possible through the rollers 46, 48 and 50 is also limited but a width of approximately 1½ inches of the block is sufficient if the three rollers are set for three wavelengths, all lying within a range whose total width is less than 1500 A.

Figure 1:
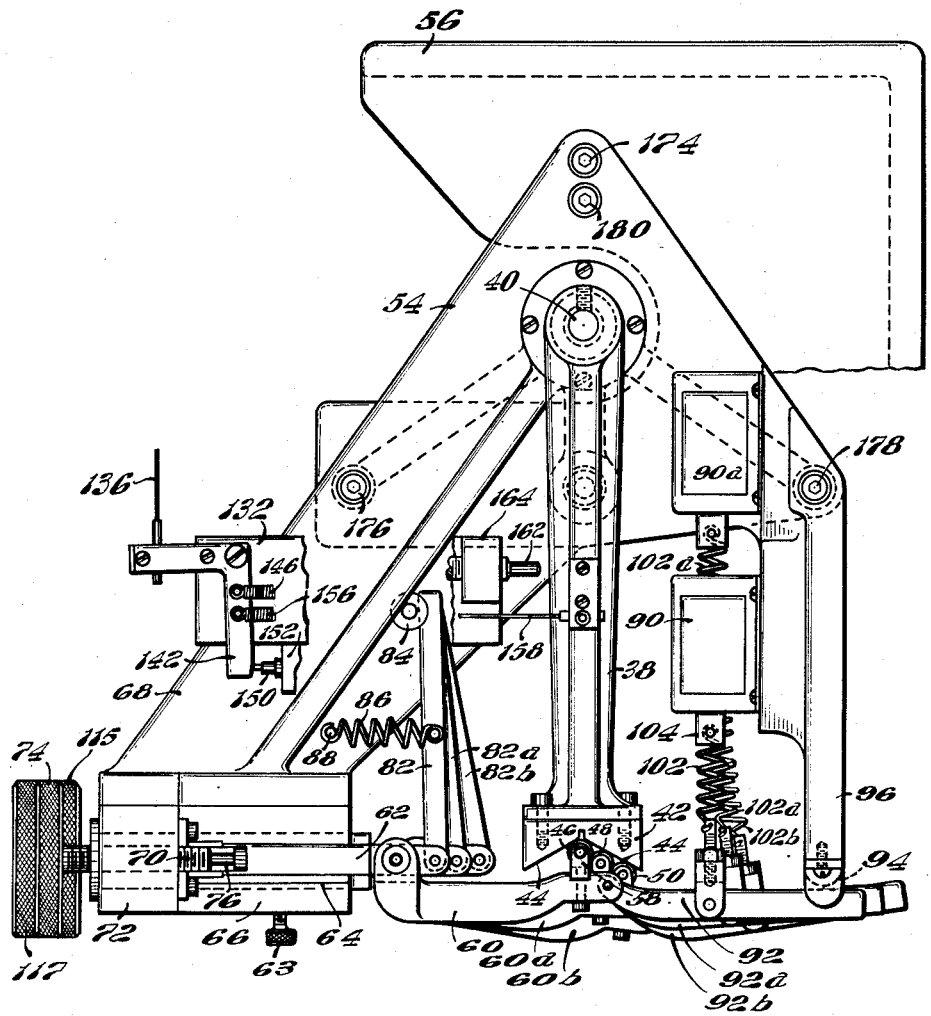
Figure 1 is a plan view of a mechanism illustrating a preferred embodiment of the present invention.
Figure 2:
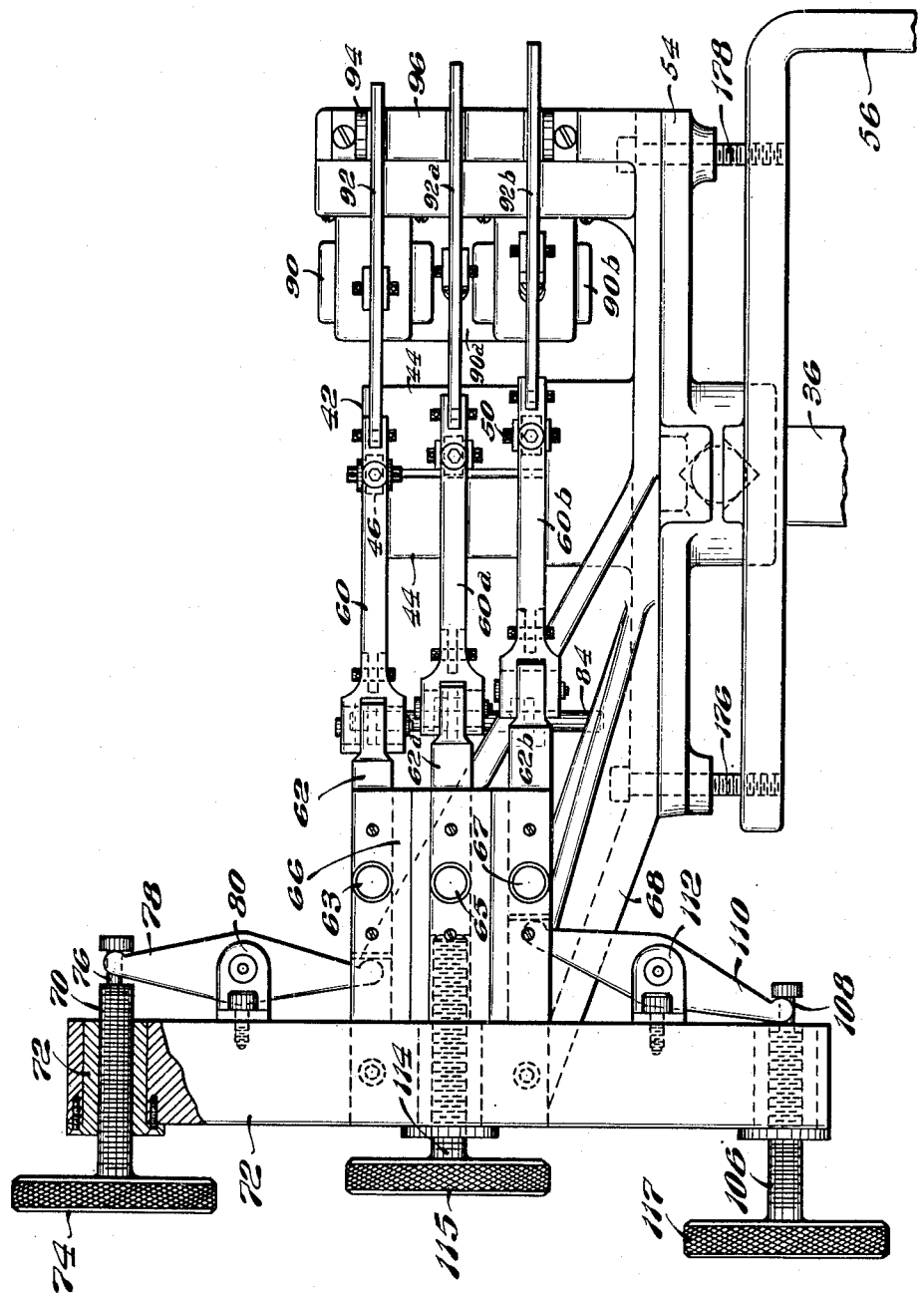
Fig. 2 is a view in front elevation of the mechanism shown in Fig. 1.
Figure 3:
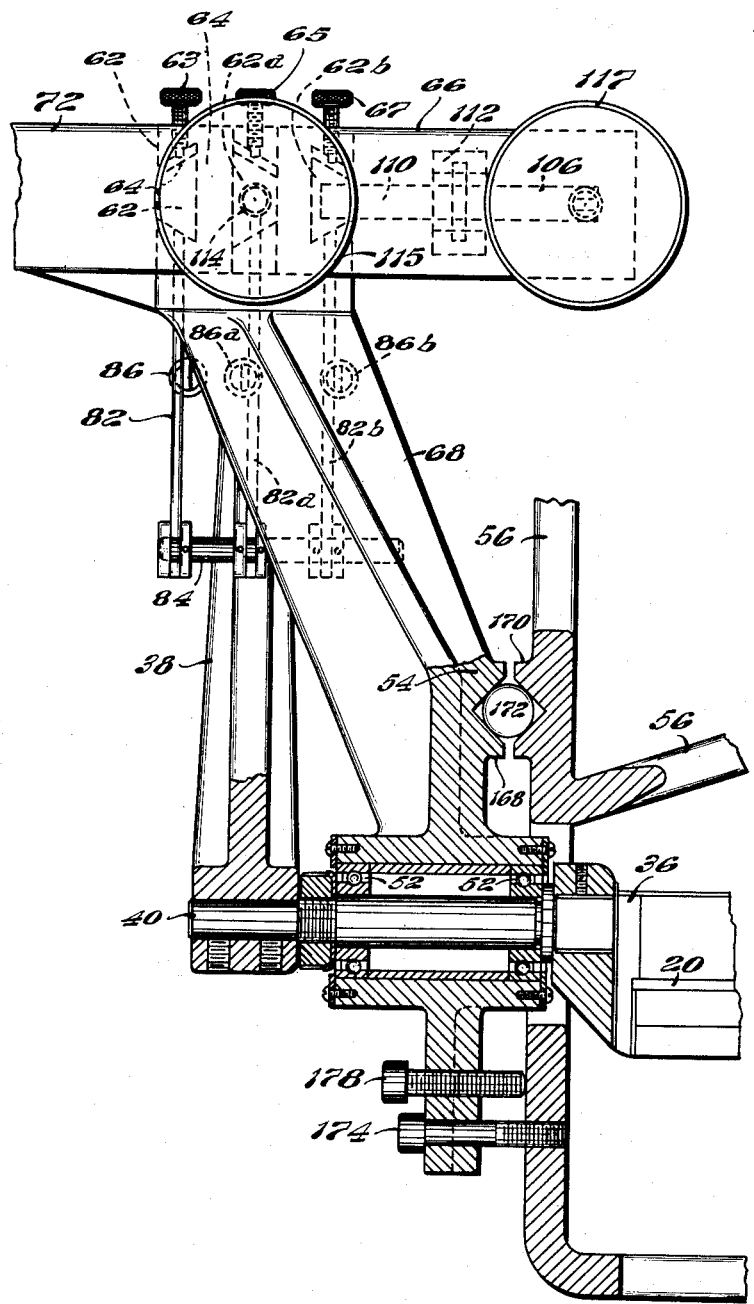
Fig. 3 is a fragmentary view, partly in section, in side elevation of the construction shown in Figs. 1 and 2.

The rollers 46, 48 and 50 are mounted on identical linkages and are adjusted and maintained in adjusted position in substantially the same manner. For example, the roller 46, as shown most clearly in Figure 1, is mounted on a supporting fork 58 fixed in the free end of a link 60. The link 60 at its other end is pivotally secured to a slide 62 which is arranged for movement in a direction substantially at right angles to the block 42. The slide 62, as shown most clearly in Figures 1 and 2, is mounted in a horizontal way 64 formed in a supporting block 66 fixed to the end of an arm 68 of the supporting frame or casting 54. The slide 62 is moved horizontally by means of a screw 70 threaded into a block 72 fixed to the guide block 66. The adjusting screw 70 is provided at one end with a knurled knob 74 and at its other end is provided with a reduced portion 76 which is arranged to receive the forked end of a lever 78. The lever 78 is pivoted to a bracket 80 which, in turn, is fixed to the support 72. The other end of the lever 78 is arranged to engage the end of the slide 62. The slide 62 is spring-held against the end of the lever 78 by a spring-biased lever 82 which is pivoted at one end to the end of the slide 62 and at its other end rests against an abutment member 84. A tension spring 86 is secured to the lever 82 intermediate its ends and at its other end is secured to a stud 88 fixed to the arm or bracket 80. Thus, by moving the screw 70 into or out of its threaded opening, the position of the roller 46 is varied transversely of the arm 38. If the arm 60, on which the roller 46 is carried, were moved toward the monochromator arm 38 and into engagement with the inclined surfaces 44 on the cam block 42, the roller 46 would cause angular movement of the arm 38 until the roller 46 was seated at the bottom of the groove formed by the converging cam surfaces 44.

The lever 60 is moved into the position described just above by connections to a solenoid 90 which is spring-connected to a link 92 pivoted at one end to the arm 60 and maintained against a stop member 94 formed on one end of an arm 96 of the supporting frame or casting 54. The lever or link 92 is connected by means of a yoke 98 to the solenoid 90 by a tension spring 102 which, under normal conditions, is under sufficient tenson to maintain the free end of the link 92 against the stop 94 and also to maintain the roller 46 in engagement with one or the other of the converging surfaces 44. Tension of the spring 102 under these conditions, however, is not sufficient to prevent swinging of the arm 38 by either of the other two similar mechanisms carrying the rollers 48 and 50. However, when the solenoid 90 is energized, the core 104 moves in a direction away from the link 92 and further tensions the spring 102, thus causing the roller 46 to swing the monochromator arm 38 in one direction or the other until the roller 46 is seated in the bottom of the groove, as has previously been described above.

Figure 4:
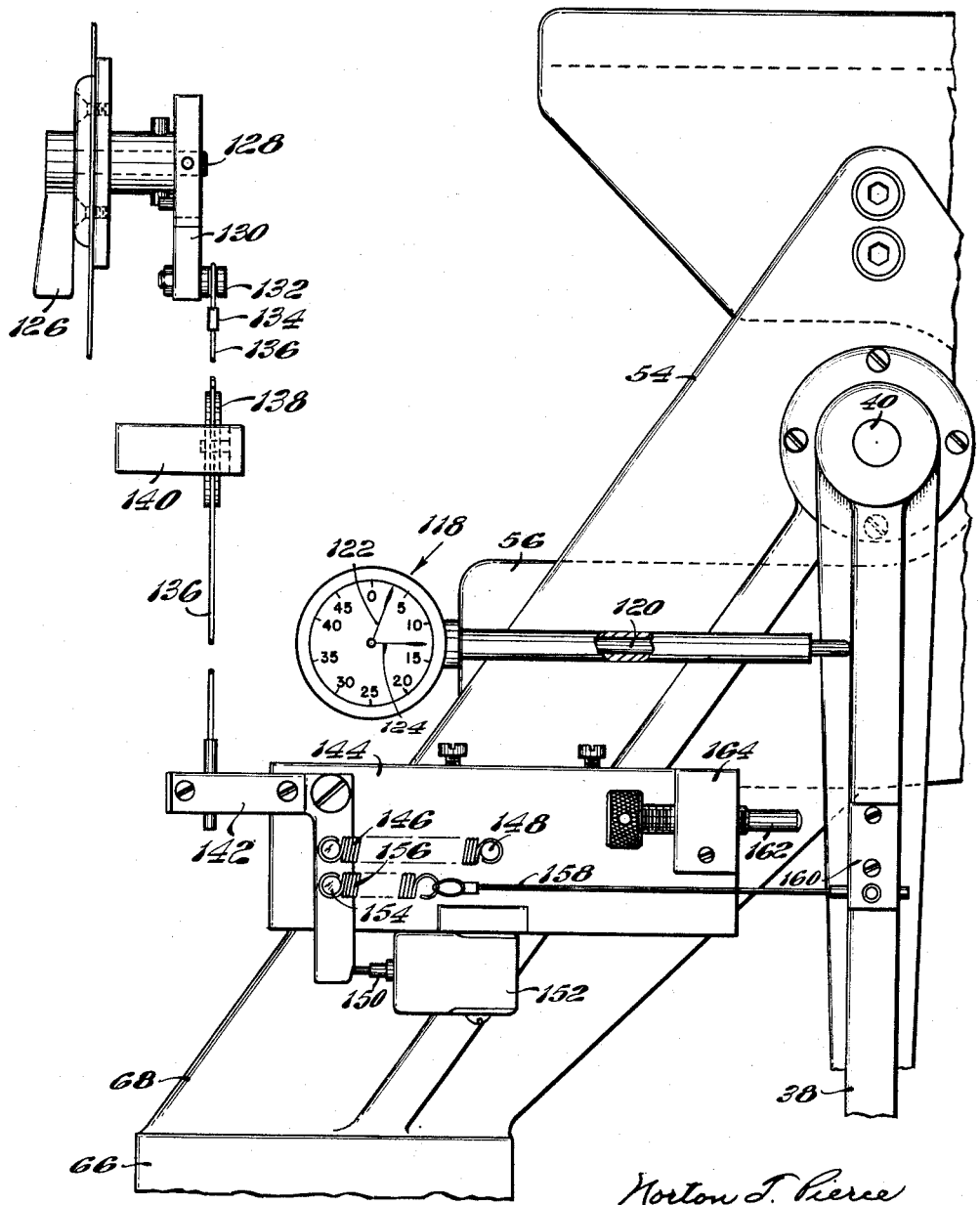
Fig. 4 is a plan view of mechanism for moving the monochromator arm into and out of position.

The rollers 48 and 50 are also provided with like linkages 60a, 92a, and 60b, 92b, respectively, which are arranged, through tension springs similar to tension spring 102, to maintain the linkages and the rollers 48 and 50 carried thereby in substantially the positions shown in Figs. 2 and 4. The links 60a and 60b are connected to slides 62a and 62b, respectively, which move horizontally in suitable ways formed in the block 66. The slide 62b is actuated for adjustment purposes by a screw 106 threaded into the lower end of the block 72. The screw 106 has a reduced upper portion 108 which receives the forked end of a lever 110 which is pivoted on a bracket 112 fixed to the block 72. The other end of the lever 110 engages the end of the slide 62b which is maintained thereagainst by a spring 86b and a link 82b, which is substantially identical to the construction shown in Figure 1. The slide 62a, however, is moved directly by a screw 114 which is threaded into the block 72 and directly engages the end of the slide 62a. The linkage system 60a, 92a is maintained in position by a spring construction 98a which is substantially identical to the spring construction used in connection with the link 92. For the purposes of convenience, it is to be noted that the adjusting screws 70 and 106 are provided with left-hand threads while the center screw 114 is provided with right-hand threads, thus enabling all three adjustments to be made in the same direction. That is to say, the rotation of the screws 70 and 106 in a clockwise direction will cause movement of the slides 62 and 62b in a direction toward the arm 38. In a like manner, clockwise rotation of the screw 114 will cause movement of the slide 62a in a direction toward the monochromator arm 38.

The roller positioning mechanism described just above determines the line of motion of the roller concerned. That is, the lateral position of the roller with respect to the center line of the monochromator is thus determined. The knurled knobs 74, 115 and 117 may be termed wavelength control knobs. Each knob can be used to preselect any desired wavelength in the range from 2200 to 3700 A. Ordinarily, the three wavelengths selected lie very close together, for example, 2810 A., 2630 A. and 2370 A.

The monochromator is also provided with a wavelength indicator 118 which is fixed to the enclosing casing of the device. This wavelength indicator shows the operator the wavelength which is currently being delivered by the monochromator. The wavelength indicator 118 consists essentially of a clock-type mechanical-displacement gauge having an arm 120 which engages the monochromator arm 38. This indicator is provided with a long hand 122 and one short hand 124 and one revolution of the long hand represents a change of 50 millimicrons or 500 A. and since each division represents one millimicron, a wavelength may be estimated within 1 A. The smaller hand shows what range the reading is in; thus it permits distinguishing 2100 A. from 2600 or 3100 A. and the like. The indicator preferably is mounted in an eccentric bushing so that minor alterations in the scale rate may be made. The outer part of the dial itself may be rotated to compensate for "zero setting" errors. Errors may enter into the system which will not be measured by the wavelength indicator, but it has been found that the indicated wavelength differs from the effective wavelength only slightly and seldom amounts to as much as 10 A.

The present construction is particularly effective since it may be focused without difficulty under visible light as hereinbefore mentioned. To accomplish this result, the monochromator is caused to deliver green light with a wavelength of about 5500 A. and this is quickly and effectively accomplished by the use of a simple mechanism which includes connections to the monochromator arm 38. As shown most clearly in Figure 4, the mechanism comprises a hand piece 126 fixed to a stub shaft 128. The shaft 128 has secured thereto a crank 130 which at its free end is provided with a shouldered stud 132. The stud 132 receives a connecting element 134 to which is fixed one end of a wire cable 136 which passes over an idler pulley 138 mounted in a bracket 140 which, in turn, is fixed to the frame of the machine. The other end of the cable 136 is clamped to one arm of a bell crank lever 142 which is pivotally supported in a plate 144 fixed to the top of the monochromator enclosing casting 56. The bell crank lever 142 is normally biased in a counterclockwise direction by a tension spring 146 fixed at one end of the bell crank 142 and at its other end to a stud 148 threaded into the plate 144. The free end of the bell crank lever 142 bears against the plunger 150 of a microswitch 152, thus normally maintaining the microswitch 152 in circuit-closing position. When the bell crank lever 142 is swung in a clockwise direction, the plunger 150 is released and the microswitch 152 is in circuit-open position. The switch 152 controls the circuit to the solenoids 90, 90a and 90b and thus prevents accidental energization of any of these solenoids during focusing of the microscope. The bell crank lever 142 has fixed thereto a stud 154 which receives the looped end of a tension spring 156. The other end of the tension spring 156 is connected to one end of a wire cable 158 which is clamped to the monochromator arm 38 by a clamp 160. Thus, when the bell crank lever 142 is swung in a clockwise direction, the monochromator arm 38 is likewise moved in a clockwise direction until it strikes an adjustable stop 162 which is threaded into a block 164 fixed to the plate 144. The position of the arm 38 against the stop 162 will move the diffraction grating 20 into a position where the visible end of the spectrum will be imaged and directed through the exit aperture 22 and reflected by the superstage mirror 24 into the barrel of the microscope 26. Visible light passing through the microscope barrel and through the specimen on the stage 30 of the microscope permits the microscope to be focused so that a sharp image of the specimen will be formed on the photosensitive film 34. The focusing of the microscope is observed through a direct vision-side tube 166 which is of usual construction.

After the microscope has been properly focused and the rollers 46, 48 and 50 have been properly positioned to provide preselected bands of light of different wavelengths, the visible light evoker is returned to its normal position, that is, the position shown in Figure 4, which permits the monochromator arm 38 to be moved to its normal center line position so that it will be free to be acted upon by successive rollers to provide ultraviolet radiations of preselected wavelengths.

The supporting frame 54 is adjustably supported on the monochromator casting 56. As shown more clearly in Fig. 3, the frame 54 and the monochromator casting 56 are each provided with a boss 168, 170, having superposed conical recesses arranged to receive between them a ball 172 about which the frame 54 may be pivoted relatively to the monochromator casting 56 in order to position the grating 20 properly with respect to the mirror 18. The frame 54 is locked in adjusted position by lock screws 174, 176, 178 extending through holes in the casting 54 and into threaded holes formed in the casting 56.

It is to be understood that the actual operation of the present device, after the focusing and wavelength settings have been made, is automatic and that the wavelength selector mechanism described above will be operated in timed relation to the other elements of the device. For example, the film-feeding and film-exposing mechanisms are so related to the monochromator mechanism that they will be operated to feed and expose spaced photosensitive areas of the film as successive preselected radiations are being transmitted thereto. Subsequently, the exposed film is processed and the developed images thereon are projected through primary color filters and are superposed in full color on a viewing screen.

It is evident that automatic operation of the wavelength selecting mechanism may be accomplished in any conventional manner either by electrical or mechanical means.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A device for preparing photomicrographs of improved quality comprising a source of radiation in at least an ultraviolet wavelength band, a plurality of optical elements arranged in the following order in the optical path of said radiation between said source and a photosensitive film, said elements comprising, respectively, collimating means, an entrance aperture for admitting a given beam of said radiation, a first plane reflecting means, a first area of a concave reflecting surface, a reflection diffraction grating for diffracting radiation within said wavelength band, a second area of said concave reflecting surface, an exit aperture, relay lens means, a second plane reflecting means, condenser lens means, means for holding a light-transmitting specimen and objective lens means for forming an image of said specimen at at least the plane of said photosensitive film, and means for moving said grating to a plurality of given positions to vary the diffraction of said radiation and provide a beam composed of a selected given portion of said wavelength band which is transmitted by said optical elements to said specimen and which is differentially transmitted therefrom to said film.

2. A device for preparing photomicrographs of improved quality comprising means providing a source of radiation for an ultraviolet wavelength band and for a visible wavelength, a plurality of optical elements arranged substantially in the following order in the optical path of said radiation between said source and a photosensitive film, said elements comprising, respectively, collimating means, an entrance aperture for admitting a given beam of said radiation, a first plane reflecting means, a first area of a concave reflecting surface, a reflection diffraction grating for diffracting radiation of said wavelengths, a second area of said concave reflecting surface, an exit aperture, relay lens means, a second plane reflecting means, condenser lens means, means for supporting a light-transmitting specimen and an objective lens means for forming an image of said specimen, and means for rotating said grating to a plurality of angular positions to vary the diffraction of said radiation and provide at one of said angular positions a beam composed of a selected given portion of said ultraviolet wavelength band for transmittal by said specimen to said film and at another of said angular positions a beam composed of visible light for visual inspection purposes.

3. A device for preparing photomicrographs of improved quality comprising means providing a source of radiation for an ultraviolet wavelength band and for a visible wavelength, a plurality of optical elements arranged substantially in the following order in the optical path of said radiation between said source and a photosensitive film, said elements comprising, respectively, collimating means, an entrance aperture for admitting a given beam of said radiation, a first plane reflecting means, a first area of a concave reflecting surface, a reflection diffraction grating for diffracting radiation of said wavelengths, a second area of said concave reflecting surface, an exit aperture, relay lens means, a second plane reflecting means, condenser lens means, means for supporting a light-transmitting specimen and an objective lens means for forming an image of said specimen at the plane of said photosensitive film, means for rotating said grating to a plurality of angular positions to vary the diffraction of said radiation and provide at one of said angular positions a beam composed of a selected given portion of said ultraviolet wavelength band for transmittal by said specimen to said film and at another of said angular positions a beam composed of visible light, and visual inspection means comprising a reflecting surface and lens means, said surface being adapted to be angularly positioned in said optical path and to deviate said path angularly to said lens means for visually observing an image of said specimen when said grating is positioned to provide said beam of visible light.

4. In a device for preparing photomicrographs, a source of radiation in at least an ultraviolet wavelength band, an entrance aperture for admitting a given beam of said radiation, a reflection diffraction grating for diffracting radiation of said wavelength band, an exit aperture, and means for rotating said grating to a plurality of given angular locations to vary the diffraction of said radiation and provide at least a beam composed of a selected given portion of said wavelength band for transmittal by said exit aperture, said diffraction grating rotating means comprising a rotatably mounted arm to which said grating is attached adjacent its axis, a pair of converging cam surfaces formed at the free end of said arm, a plurality of levers each having a cam follower at an extremity for engaging said cam surfaces and each being offset with respect to another so as to engage a portion of said cam surfaces at a relatively different distance from the line of convergence of said surfaces, means for selectively actuating movement of said levers so that a given cam follower is predominantly urged against the slope of one of said cam surfaces and causes rotation of said arm and the attached grating by an amount according to the distance of the cam follower from said line of convergence of the cam surfaces existing prior to movement of said cam follower by said actuating means.

5. In a device for preparing photomicrographs, a source of radiation in at least an ultraviolet wavelength band, an entrance aperture for admitting a given beam of said radiation, a reflection diffraction grating for diffracting radiation of said wavelength band, an exit aperture, and means for rotating said grating to a plurality of given angular locations to vary the diffraction of said radiation and provide at least a beam composed of a selected given portion of said wavelength band for transmittal by said exit aperture, said diffraction grating rotating means comprising a rotatably mounted arm to which said grating is attached adjacent its axis, a pair of converging cam surfaces formed at the free end of said arm, a plurality of levers each having a cam follower at an extremity for engaging said cam surfaces and each being offset with respect to another so as to engage a portion of said cam surfaces at a relatively different distance from the line of convergence of said surfaces, means biasing said levers so that said cam followers are urged substantially equally in a direction toward said cam surfaces, means for additionally urging said levers in the direction provided by said biasing means, the last-named means selectively moving said levers in said direction so that a given cam follower is predominantly urged against the slope of one of said cam surfaces and causes rotation of said arm and the attached grating in response thereto by an amount according to the distance of the cam follower from said line of convergence of the cam surfaces which existed prior to the actuation of said cam follower by said additionally urging means.

6. In a device for preparing photomicrographs, a source of radiation in at least an ultraviolet wavelength band, an entrance aperture for admitting a given beam of said radiation, a reflection diffraction grating for diffracting radiation of said wavelength band, an exit aperture, and means for rotating said grating to a plurality of given angular locations to vary the diffraction of said radiation and provide at least a beam composed of a selected given portion of said wavelength band for transmittal by said exit aperture, said diffraction grating rotating means comprising a rotatably mounted arm to which said grating is attached adjacent its axis, a pair of converging cam surfaces formed at the free end of said arm, a plurality of levers each having a cam follower at an extremity for engaging said cam surfaces and each being offset with respect to another so as to engage a portion of said cam surfaces at a relatively different distance from the line of convergence of said surfaces, spring means biasing said levers so that said cam followers are urged substantially equally in a direction toward said cam surfaces, electromagnetic means for additionally urging said levers in the direction provided by said biasing means, the last-named means selectively moving said levers in said direction so that a given cam follower is predominantly urged against the slope of one of said cam surfaces and causes rotation of said arm and the attached grating by an amount according to the distance of the cam follower from said line of convergence of the cam surfaces existing prior to operation of said electromagnetic means.

7. In a device for preparing photomicrographs, a source of radiation in at least an ultraviolet wavelength band, an entrance aperture for admitting a given beam of said radiation, a reflection diffraction grating for diffracting radiation of said wavelength band, an exit aperture, and means for rotating said grating to a plurality of given angular locations to vary the diffraction of said radiation and provide at least a beam composed of a selected given portion of said wavelength band for transmittal by said exit aperture, said diffraction grating rotating means comprising an arm mounted for rotation on a vertical axis to which said grating is attached adjacent said axis, a pair of converging cam surfaces extending generally laterally at the free end of said arm, a plurality of levers each having a cam follower at an extremity adapted to be pivoted toward and to engage said cam surfaces at a relatively different vertical level and each being offset laterally with respect to another so as to engage a portion of said cam surfaces at a relatively different distance from the line of convergence of said surfaces, selector means for adjusting the lateral position of said levers to vary the location of said cam followers relative to said line of convergence and thereby to control the angles of rotation of said arm, means for selectively actuating movement of said levers so that a given cam follower is predominantly urged against a given portion of one of said cam surfaces and causes rotation of said arm and the attached grating by an amount according to the distance of the cam follower from said line of convergence of the cam surfaces existing prior to operation of said actuating means.

8. In a device for preparing photomicrographs incorporating a reflection diffraction grating, means for rotating said grating to a plurality of given angular locations to vary the diffracting properties thereof and provide selective transmittal of portions of radiation of a given wavelength range by an exit aperature of said device, said rotating means comprising an arm pivotally mounted for rotation about a vertical axis to which said reflection diffraction grating is fixedly attached, means providing a pair of converging cam surfaces integral with the arcuately movable extremity of said arm, said surfaces having a vertical line of convergence which is located radially of and parallel with said vertical axis, a plurality of levers each having a cam follower at an extremity for engaging said cam surfaces at a different relative vertical level and each offset horizontally with respect to another so as to engage a portion of said cam surfaces at a relatively different distance from the line of convergence of said surfaces, biasing means providing a substantially equal light contact of said cam followers with at least one of said surfaces, electromagnetic means for selectively reinforcing the bias applied by said biasing means to move one of said levers so that a given cam follower applies additional force to a given cam surface and causes said arm and the attached grating to rotate in a given direction by an amount determined by the distance between said cam follower and the line of convergence which existed prior to energization of said electromagnetic means.

9. A device according to claim 8 wherein said cam followers consist of three cam followers for providing three rotational positions of the reflection diffraction grating and wherein is additionally included means for manually moving said grating to a given fourth rotational position.

10. A device according to claim 9 wherein is additionally included means for breaking the circuit for energizing said electromagnetic means while said grating is being moved manually to said fourth rotational position.

11. A device for preparing photomicrographs of improved quality comprising a source of radiation in at least an ultraviolet wavelength band, a plurality of optical elements arranged substantially in the following order in the optical path of said radiation between said source and a photosensitive film, said elements comprising, respectively, collimating means, an entrance aperture of given width, a first plane reflecting surface, a first area of a concave reflecting surface, a reflection diffraction grating adapted to diffract radiation of at least said wavelength band, a second area of said concave reflecting surface, an exit aperture of given width, a second plane reflecting means, condenser lens means, means for holding a specimen adapted to differentially absorb ultraviolet radiation and image-forming objective lens means, and means for rotating said reflection diffraction grating to a plurality of given angular positions to vary the diffraction of said radiation and to provide at least a beam composed of a selected given portion of said wavelength band for transmittal to said specimen, the last-named means comprising a rotatably mounted arm to which said grating is attached adjacent its axis of rotation, a pair of converging cam surfaces formed at the free end of said arm, a plurality of levers such having a cam follower at an extremity for separately applying an actuating force to said cam surfaces and each being offset with respect to another so as to engage a portion of said cam surfaces at a relatively different distance from the line of convergence of said surfaces, means for selectively actuating said levers so that a given cam follower is predominantly urged against one of said cam surfaces to cause rotation of said arm and the attached grating by an amount which is determined by the distance of the cam follower from said line of convergence existing prior to movement of said cam follower in response to said actuating means.

References Cited in the file of this patent
UNITED STATES PATENTS

| | | |
|---|---|---|
| 2,077,792 | Heine | Apr. 20, 1937 |
| 2,153,010 | Snook | Apr. 4, 1939 |
| 2,282,643 | Cutting | May 12, 1942 |
| 2,339,053 | Coleman | Jan. 11, 1944 |
| 2,404,064 | Heigl | July 16, 1946 |
| 2,483,746 | White | Oct. 4, 1949 |
| 2,757,568 | Fastie | Aug. 7, 1956 |

FOREIGN PATENTS

| | | |
|---|---|---|
| 166,028 | Great Britain | July 14, 1921 |